June 13, 1950 H. EKSTEIN ET AL 2,511,152
X-RAY DIFFRACTION METHOD
Filed May 10, 1949 3 Sheets-Sheet 1
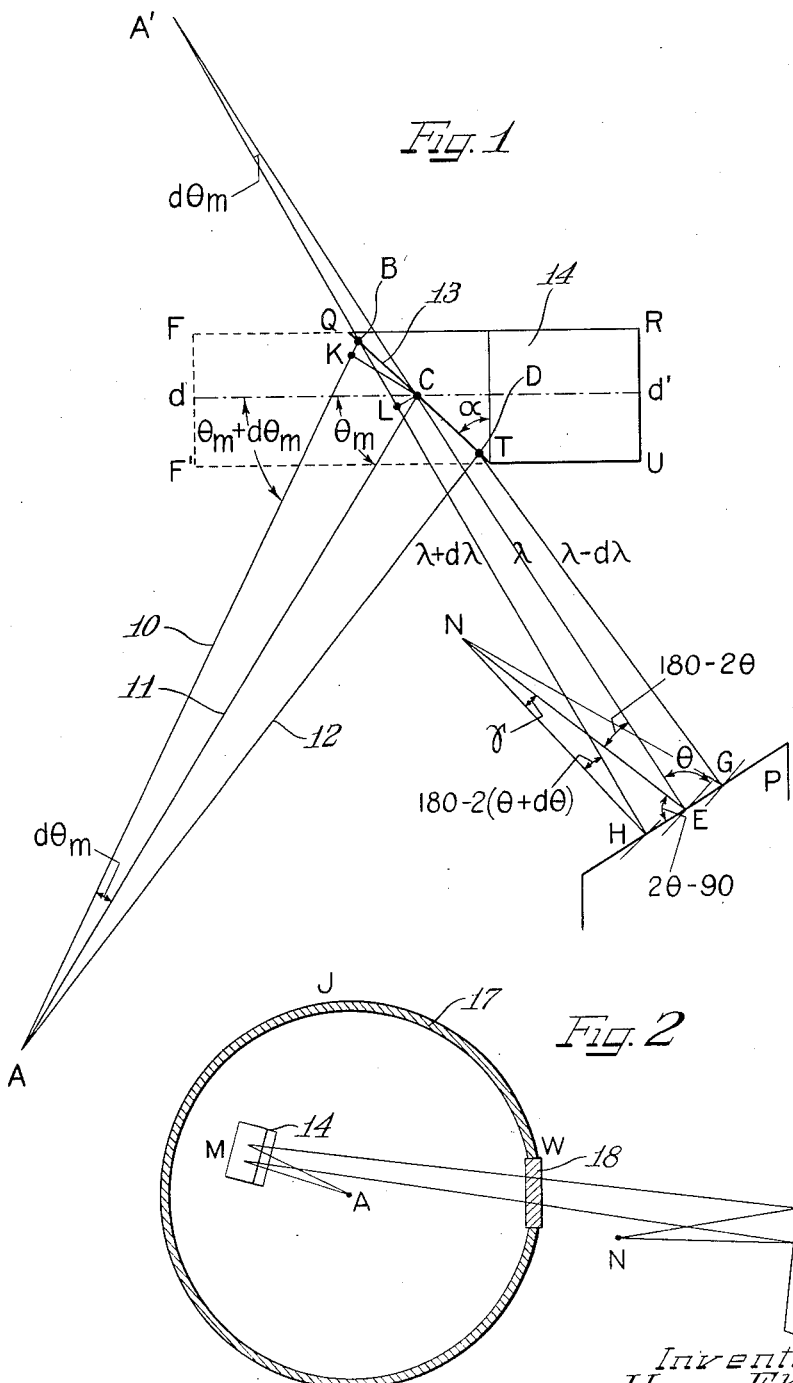
Inventors
Hans Ekstein &
Stanley Siegel
by The Firm of Charles K. Hill Attys

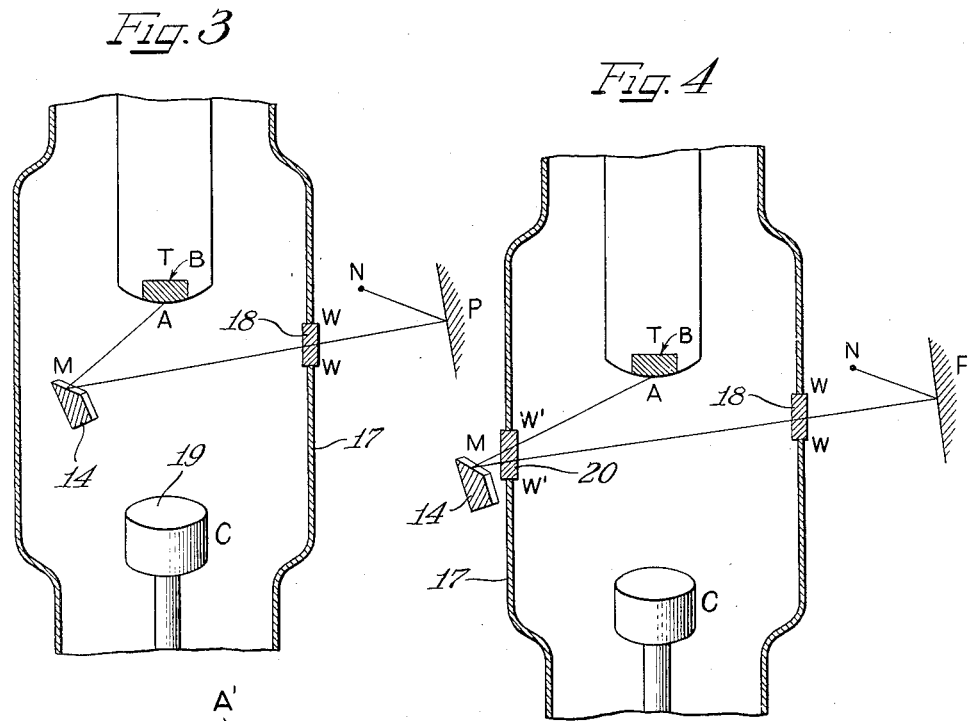
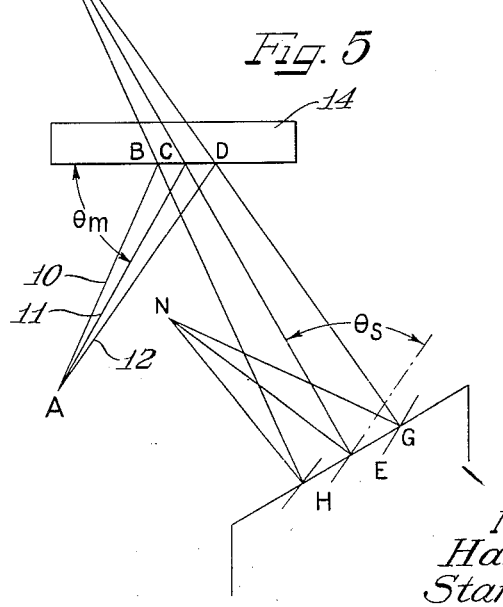

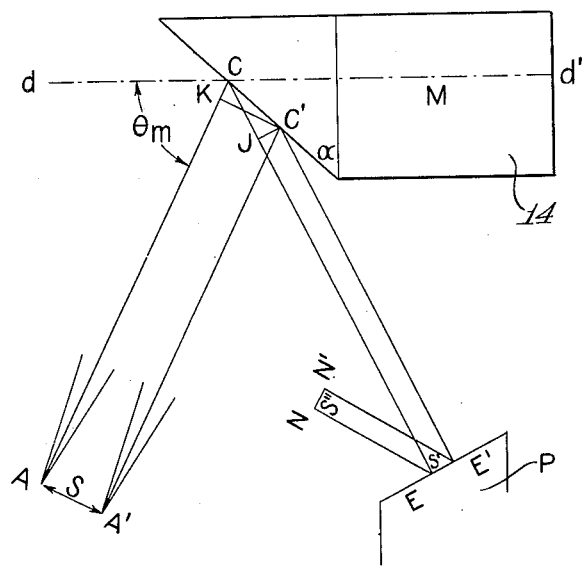
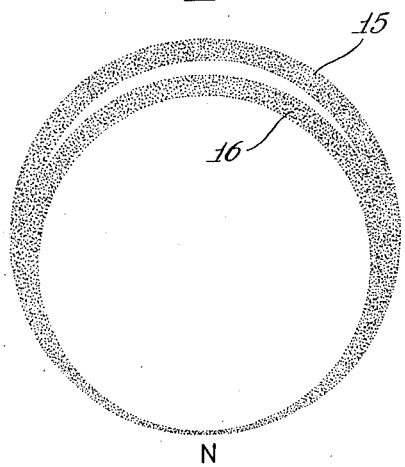
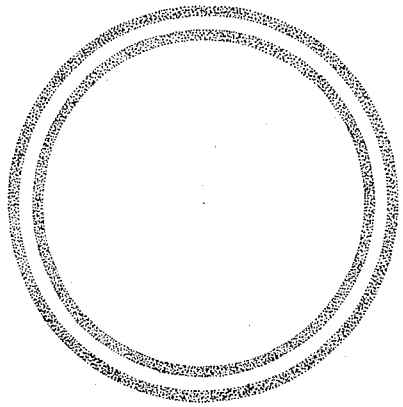
Inventors
Hans Ekstein &
Stanley Siegel

Patented June 13, 1950

2,511,152

UNITED STATES PATENT OFFICE 2,511,152

X-RAY DIFFRACTION METHOD

Hans Ekstein and Stanley Siegel, Chicago, Ill., assignors to Armour Research Foundation of Illinois Institute of Technology, Chicago, Ill., a corporation of Illinois Application May 10, 1949, Serial No. 92,482

3 Claims. (Cl. 250—53)

This invention relates to an improved method and apparatus for increasing the accuracy of lattice parameter determinations, and particularly, to a method and apparatus for effecting the achromatization of a beam of X-rays upon an X-ray-sensitive indicating medium after diffraction of such a beam by a sample to be analyzed.

This application is a continuation-in-part of our copending application, entitled "X-ray apparatus and method," U. S. Serial No. 775,824, filed September 24, 1947, and assigned to the same assignee as the present invention.

Knowledge of the internal structure of matter is made possible by X-ray diffraction studies in which one deduces the internal structural properties of matter by observation of the direction and intensity of the diffracted rays. Laue's discovery of the diffraction of X-rays by crystals was soon followed by W. L. Bragg's treatment of the diffraction as a reflection process. This resulted in the derivation of Bragg's law, which gives the angle of the diffracted ray as a function of the wave length of the incident ray and the atomic spacing in the diffracting medium. The mathematical equation expressing Bragg's law is:

$$n\lambda = 2d \sin \theta$$

In this equation, $n$ is a number called the order of reflection or spectral order, $d$ is the atomic spacing between recurring similar layers of lattice particles measured perpendicular to any set of layers which may be in question, while $\lambda$ is the wave length of the X-rays, and $\theta$ is the glancing angle made by the beam of X-rays with the layers of lattice particles.

In the early development of diffraction techniques, the determination of $d$ could not be made with any reasonable accuracy because of the difficulty of determining the angle between the reflected and transmitted rays. The many problems in alloy and solid solution studies, as well as stress evaluations by the X-ray method, made it necessary to determine $d$ in the Bragg equation with as great accuracy as possible. It is clear that the accuracy with which one can determine $d$ depends on the accuracy with which one can determine the center of a diffraction line. A large number of different instruments have been developed in the past for producing the sharpest possible X-ray diffraction line together with a reasonable intensity. Some of these instruments increase the intensity of the line by geometrical focusing of rays of a given wave length, but different angular direction, in particular, the rays belonging to the $K_{\alpha 1}$ and/or $K_{\alpha 2}$ radiations. It is also well known that these $K_{\alpha 1}$ and/or $K_{\alpha 2}$ radiations (loosely and many times conveniently called monochromatic radiations) have very small but finite ranges of wave lengths. According to Bragg's law, the rays of different wave length are diffracted with different angles. Consequently, the diffraction line will have a finite width corresponding to the spectral width of the primary radiation. Geometric focusing does not alter this circumstance, since the theory of the geometric focusing is based on the simplifying assumption of purely monochromatic radiation. In the language of optics, the focus produced by known focusing instruments is chromatic, i. e., different "colors" are focused at different points of the recording film. In particular, at large angles of diffraction, which are necessary in precision determinations of lattice parameters (as for phase studies, stress measurements, etc.), the diffraction line becomes inevitably broad because of the finite spectral width of the characteristic radiation and because of the diffraction mechanism.

It has been recognized recently (H. Ekstein and S. Siegel, National Advisory Committee for Aeronautics Tech. Note No. 1375, October, 1947) that this width of the diffraction line, due to the spectral impurity of the primary radiation constitutes the present limit of accuracy of the lattice parameter and stress determinations by X-rays. A strictly parallel and monochromatic beam when striking a crystal aggregate of sufficiently large grains, will give rise to a diffracted beam of negligible angular width. It is not possible, however, to produce a single X-ray line (such as the $K_{\alpha 1}$ line) of a single wave length, but rather, all characteristic X-ray lines consist of a finite band of wave lengths. It, therefore, follows that under the usual conditions, the resulting diffracted beam cannot give rise to a line any narrower than that corresponding to the spectral width of the initial beam. It is true that other factors such as the geometric conditions and small size of crystal grains also cause a broadening of the line in excess of that due to the spectral impurity of the incident radiation.

It will further be understood by those skilled in the art that at large Bragg angles $\theta$ of diffraction, where the Bragg angle $\theta$ has the largest sensitivity to changes in lattice parameters, the width caused by this spectral impurity is predominant even when the geometric arrangements are as refined as is currently feasible. It, therefore, becomes apparent that no further refinement of the geometry of the system can produce a line substantially narrower than those currently obtained. In order to express the limitations of the present Debye-Scherrer technique quantitatively, one can use as a figure of merit the resolution as in the grading of spectrographs. For a difference $\Delta d$ of two lattice parameters which give rise to two diffraction lines just resolvable (in the Rayleigh sense) it can be shown that $$\left(\frac{\Delta d}{d}\right) \approx 5.10^{-4}$$

(H. Ekstein and S. Siegel, Phys. Rev. 73, page 1207, 1948) with an ideal crystal material, infinitely narrow collimator and, in general, all sources of line broadening except the spectral impurity being eliminated.

This limitation applies, of course, also to techniques using geometric focusing, since these techniques merely have the advantage of higher intensity, but do not correct the chromatism.

A technique known as "double-crystal spectrometry" has been suggested in the past as an alternative method by which a sharper line may be obtained. In this technique, the X-rays emanating from a target strike successively the reflecting faces of two crystals before passing to the sample to be analyzed. The first crystal plays the role of a collimator in that it selects out of the original divergent beam, for presentation to the second crystal, only rays which are sensibly parallel. Since the second crystal repeats the role of the first crystal, it will be apparent, as it has been to those skilled in the art, that this technique is accompanied by a prohibitive loss in intensity, and for that reason, it is not feasible for most uses.

From the above discussion, it will be observed that previous methods with the exception of double-crystal spectrography have served to reduce the line width to a small, but not negligible quantity. A double-crystal spectrometer, however, entails a practically prohibitive intensity loss.

A method has been suggested in the past for obtaining a geometrical and monochromatic focus (as distinct from an achromatic focus) by the use of a bent-crystal "monochromator." This technique is predicated on the assumption that if it were possible to obtain a purely monochromatic beam of X-rays, such a beam may be brought to a geometrical focus by diffraction from a bent crystal. However, in order to produce a truly monochromatic beam, the bent-crystal "monochromator" would require a true point source, which, of course, would have zero energy. Practically, the best bent-crystal "monochromators" monochromatize so little that in every diagram both the $K_{\alpha 1}$ and the $K_{\alpha 2}$ lines are visible. In other words, the bent-crystal "monochromator," far from isolating one wave length out of the wave length band $K_{\alpha 1}$, does not even suppress the $K_{\alpha 2}$ band. (See A. Guinier, "Radiocristallegraphie," Dunod, Paris, 1945.) This results in dispersion after diffraction, even from a bent-crystal, and hence, only chromatic focusing can be obtained. The real advantage of the bent-crystal technique lies in the accumulation of large amounts of the characteristic radiations.

The use of beveled single crystals has been suggested in the past to increase intensity, but beveled crystals by themselves will not achromatize the diffracted beam.

One of the principal features and objects of the present invention is to provide a novel technique and apparatus for obtaining a narrowed diffraction line without using a third reflecting crystal.

It is a further feature and object of the present invention to provide a novel technique in which an X-ray beam is achromatized.

In considering the present invention, attention is directed to the fact that the term "monochromatization" as used in current literature is not used in a precise sense, but is rather used loosely. None of the present "monochromators" used for Debye-Scherrer diagrams reduce the wave length band of the incident radiation below the wave length width of the single line (whether it be the $K_{\alpha 1}$ line or the $K_{\alpha 2}$ line). Care must also be taken in considering the term "focusing," for the present invention is not a variant of the conventional focusing techniques. All conventional techniques, as hereinbefore pointed out, are based on the assumption of a truly monochromatic wave and, if such a wave can be obtained (which is an assumption not supported by fact), a very narrow line for one incident wave length will result. None of the conventional techniques even contemplates a remedy for the diffusion of the line which necessarily results from non-monochromatization of the natural line.

To illustrate the nature of the difference between the present invention and previous ones, reference might be made to the difference between optic lens systems with and without achromatization. The previous developments in X-ray are analogous to correction of lens systems for astigmatism, spherical aberration, etc. The present invention is analogous to the achromatization which eliminates certain residual errors due to color and wave length differences in the incident light.

Accordingly, one of the principal features and objects of the present invention is to provide a novel method and apparatus which leads to the achromatization of X-rays resulting in the formation of diffraction lines which are substantially narrower than those currently obtained by focusing spectrometers or focusing "monochromators." Such achromatization is brought about by eliminating the line broadening effects caused by spectral impurity.

The method and apparatus of this invention involve the utilization of a diverging beam of X-rays which includes a band of wave lengths (the so-called monochromatic $K_{\alpha 1}$ line and/or $K_{\alpha 2}$ line, $K_{\beta}$, etc.). The rays of each distinct wave length are caused to pass through a predetermined focal point after diffraction by a polycrystalline sample being analyzed. Such a focus is achromatic as distinct from the chromatic focus produced by the conventional focusing spectrometers and/or focusing "monochromators." The achromatic focus is thus sharp and the precision of lattice parameter values is thereby greatly increased.

Accordingly, it is a further object of this invention to provide a novel method and apparatus for X-ray analysis of crystal structure including a method of achromatization whereby a diffraction line is produced having a width narrower than has been heretofore possible.

Another object of this invention is to provide a novel method and apparatus for achromatization of X-rays wherein large Bragg angles of incidence of the X-rays upon the polycrystalline sample may be employed.

A still further object of this invention is to provide an X-ray tube envelope particularly adapted for producing a beam of X-rays of such characteristics that the diffraction of such a beam by a polycrystalline sample which is positioned exterior to the tube envelope will automatically produce an achromatized diffraction line, and which envelope and associated equipment are so constructed that many wave lengths can be utilized.

Still another and further object of the present invention is to provide a novel method and apparatus in which a diverging polychromatic beam is allowed to fall on the plane surface of a single crystal, and in which the diverging diffracted beam is allowed to fall on the polycrystalline sample to be analyzed.

Still another and further object of the present invention is to provide a novel method and apparatus for achromatization of X-rays wherein a diverging polychromatic beam is allowed to fall on the surface of a single crystal, which surface is disposed at a predetermined angle with the normal to a prominent diffracting plane, and which beam after diffraction by the single crystal, diverges onto a polycrystalline sample from which the diverging beam is converged to an achromatic focus.

Still another and further object of the present invention is to provide a novel method and apparatus for achromatization of X-rays with an extended source.

Still another and further object of the present invention is to provide a novel method and means wherein a beam of X-rays strikes a flat crystal surface to produce a band of wave lengths ranging from $\lambda - d\lambda$ to $\lambda + d\lambda$, and wherein such a diffracted band of wave lengths is then allowed to fall normal upon a polycrystalline sample whereby all rays will be achromatized, for all wave lengths will come to an intersection at a common point.

The novel features which we believe to be characteristic of our invention are set forth with particularity in the appended claims. Our invention itself, however, both as to its organization, manner of construction and method, together with further objects and advantages, may best be understood by reference to the following description taken in connection with the accompanying drawings, in which:

Figure 1 is a schematic view of the X-ray achromatization system illustrating the fundamental concept employed in accordance with this invention to obtain an achromatized X-ray beam after diffraction by a polycrystalline sample.

Figure 2 is a schematic cross-sectional view illustrating one arrangement of an X-ray tube and shielding jacket for producing X-ray achromatization in accordance with this invention.

Figure 3 is a schematic longitudinal sectional view of Figure 2.

Figure 4 is a longitudinal sectional view illustrating a modified construction of an X-ray tube and jacket for producing achromatized X-rays by the principles of the present invention.

Figure 5 is a view similar to Figure 1 but illustrating the incident beam of X-rays striking a prominent diffracting plane of the single crystal rather than striking a plane face of the single crystal which lies at an angle to a prominent diffracting plane.

Figure 6 is a schematic view of an X-ray achromatization system embodying the novel principles and teachings of the present invention with an extended source rather than a point source as illustrated in Figure 1.

Figure 7 is a schematic reproduction of a photographic film illustrating the compression at the focus when the technique of the present invention is employed.

Figure 8 is a schematic representation of an actual photograph of the same sample as that employed for Figure 7 when made in accordance with the prior teachings.

One embodiment of the present invention is illustrated in Figure 1 of the drawings wherein a bias-cut single crystal is employed and wherein achromatization is accomplished in accordance with the novel and distinctive method and apparatus of the present invention.

More particularly, A is a source of X-rays on an X-ray target. A diverging polychromatic bundle of these rays emanate from the source A and are represented by the lines 10, 11 and 12, the line 11 being the central axis of the bundle, while the lines 10 and 12 are employed to indicate that the bundle is of finite width, divergent, and composed of different wave lengths. This divergent polychromatic bundle of X-rays emanating from the source A strikes a plane face 13 of a crystal 14. The plane face 13 represented by the line QCT is disposed at a predetermined angle $\alpha$ with respect to the normal to the surface TU. The surface TU is a surface which was cleaved parallel to (or ground parallel to) a prominent diffracting plane indicated by the dash-dot line $dd'$. The broken line QFF''T indicates a portion of the crystal removed in forming the bias-cut face 13.

The crystal 14 is oriented relative to the incoming divergent polychromatic bundle of X-rays so that the $K\alpha_1$ line, say, is reflected. The angle $\theta_m$, as shown in Figure 1 of the drawings, is the Bragg angle and defines that particular angle at which the most intense wave length component $\lambda$ of the characteristic radiation is reflected. Of the many wave lengths traveling in the direction AC from the source A, only that wave length $\lambda$ which satisfies Bragg's law (as previously referred to) will be diffracted. The reflected ray will travel in the direction CE until it is intercepted by the polycrystalline sample P to be analyzed.

Referring back to the original bundle of X-rays which are emanating from the source A, it will be noted that of the many wave lengths traveling in the direction AB along the line 10 and making an angle $\theta_m + d\theta_m$ with the atomic plane $dd'$, only the ray of wave length $\lambda + d\lambda$ will be reflected. This ray will travel in the direction BH. Of the many wave lengths traveling in the direction AD along the line 12, for example, and making an angle $\theta_m - d\theta_m$ with the atomic plane $dd'$, only the ray of wave length $\lambda - d\lambda$ will be reflected, and this ray will travel in the direction DG.

Now, in accordance with the teachings of the present invention, the polycrystalline sample P is mounted with a surface normal to the ray of wave length $\lambda$, and by so positioning the polycrystalline sample P, the rays diffracted by the polycrystalline sample will, under the conditions to be described hereinbelow, intersect at the point N. The image N, therefore, is the achromatic focus. No X-ray method heretofore known has ever produced such an achromatic focus.

Now, let us consider the conditions under which an achromatic focus may be obtained at N with only two crystals, namely, the single crystal 14 and the polycrystalline sample P. In order for the ray $\lambda$ to be diffracted by the polycrystalline sample P, it is necessary that this ray strike an atomic plane $d$, in the sample, at an angle $\theta$. Under such circumstances, the ray will be diffracted and will travel in the direction EN, and this diffracted ray traveling along the path EN makes an angle of $180°-2\theta$ with the incident ray $\lambda$ traveling along the path CE. The ray of wave length $\lambda+d\lambda$ must make an angle of $\theta+d\theta$ with the atomic plane $d$ in the polycrystalline sample P, and hence, the ray diffracted at the point H will travel in a direction HN, for the angle between the incident ray BH and the diffracted ray HN has now decreased to $180°-2(\theta+d\theta)$. Similarly, the ray of wave length $\lambda-d\lambda$ must make an angle $\theta-d\theta$ with the atomic plane $d$ of the polycrystalline sample P, and hence, will travel along the path GN which is disposed at an angle $180°-2(\theta-d\theta)$. These diffracted rays HN, EN and GN are converging upon each other at the point N. This produces an achromatic image or focus. Even though the wave length range $\lambda+d\lambda$, $\lambda$, and $\lambda-d\lambda$ are made up of the $K\alpha_1$ and $K\alpha_2$ radiations, the use of the present achromatization system will cause these lines to come to a common intersection at the focus N. This contrasts sharply with the X-ray spectrometers, "monochromators," and other focusing arrangements previously known in which it will always be seen that the $K\alpha_1$ and the $K\alpha_2$ lines never come to a focus, but rather appear side by side displaced from each other. Thus, by following the novel teachings of the present invention, a wave length band can be achromatized to obtain a sharp diffraction line.

We have found that it is possible to determine the exact position N at which point a photographic film must be placed in order that the lines be rigorously achromatic. This position is indicated by the following formula:

$$F = \frac{V - l\frac{\cos(\theta_m+\alpha)}{\cos(\theta_m-\alpha)}}{\left(1+2\frac{\tan\theta}{\tan\theta_m}\right)\left(-\frac{1}{\cos 2\theta}\right)}$$

where:

$l = AC$ $a$ = angle between ground surface QT of crystal and the normal to the prominent atomic spacing $dd'$ $V = CE$, the distance between the single crystal and the polycrystalline sample P $\theta_m$ = the diffraction angle in the crystal QTUR $\theta$ = the diffraction angle in the sample P $F$ = the distance NE, which is the focal distance, or the distance from the polycrystalline sample at which the film must be placed so that an achromatic image of the source A is obtained.

The focus at N is an image of the X-ray source A. If A is a point or a line source, the point N will be a corresponding line image. If the source A has a finite width S (that is, has both a length and a width dimension), then it is possible to produce a sharp focus at N by a proper choice of $\alpha$ and $\theta_m$.

By the use of the following formula, and by the use of a bias-cut single crystal, the image of width $S''$ obtained at N may be made to be a reduced image of the X-ray source A of width S:

$$S'' = S \cos 2\theta \frac{\cos(\theta_m+\alpha)}{\cos(\theta_m-\alpha)}$$

where $S''$ = the width of image at N, as shown in Figure 6.

This sharply reduced image of the source A is possible only with the use of a crystal cut in a manner as indicated in Figure 1 of the drawings and employed in an achromatization system such as that described above.

Figures 7 and 8 are ink reproductions of actual photographs taken of a single sample, Figure 7 being that obtained using the technique of the present invention, and Figure 8 being a typical Debye-Scherrer photograph, in which the scatter of reflections outside of the Laue direction is quite pronounced. By way of example, and not by way of limitation, Figure 7 shows the pattern obtained after 100-hour exposure in a system of the type diagrammatically illustrated in Figure 1 and with the X-ray tube operating at 40 kv. and 7 ma. during this interval. The outer line 15 is the $\alpha_1$ component and the inner line 16 is the $\alpha_2$ component. It will be observed that both coalesce quite uniformly at the focus N (the bottom of the diagram). It will further be observed that the $\alpha_1$ and $\alpha_2$ lines diametrically opposite the focus N show appreciable divergence. While by way of example, the reproduction made in Figure 7 was obtained after a 100-hour exposure, it has been found that a reasonable photographic density in the region near N can be obtained at approximately one-quarter of this time. This diagram in Figure 7 shows a pronounced difference from that shown in Figure 8. Thus, in Figure 7, it will be noted that even with a heavy exposure there are practically no reflections outside of the region of focus. This contrasts sharply with the Debye-Scherrer photograph of the same sample in Figure 8 in which the scatter of reflections outside of the Laue directions is quite pronounced.

Figure 2 of the drawings shows schematically an apparatus for conveniently utilizing the X-ray achromatization technique hereinbefore described. More specifically, as shown in Figure 2, an X-ray tube is provided which includes a jacket 17 having a window 18 therein and a target A. The bias-cut single crystal 14 is placed in the tube 17 on any suitable, convenient crystal mount (not shown) so that it can be oriented in any desired manner relative to the beam originating at A. After diffraction by the crystal 14, the diverging beam passes out through the window 18 and strikes the polycrystalline sample P where diffraction occurs which results in achromatization at N.

Figure 3 is a longitudinal sectional view of this same tube diagrammatically illustrated in Figure 2, but here, the electron gun 19 is illustrated which projects a beam of electrons against the target A of the X-ray tube. This target may conveniently be in the form of a button B composed of any desired metal so that any desired wave length may be obtained. X-rays originating at the point of electron focus A strike the single crystal 14 and are diffracted back through the window 18 to the polycrystalline sample P. Here, the diverging diffracted beam of rays is again diffracted and achromatized at N.

A modified form of the present invention is illustrated in Figure 4 of the drawings wherein the single crystal 14 is located outside of the tube jacket 17. In this case, a second window 20 is also provided so that the beam from A traverses window 20, strikes the single crystal 14 and is then diffracted back through both window 20 and window 18 to the polycrystalline sample P.

In Figure 5 of the drawings, an achromatization system is shown similar to that illustrated and described in connection with Figure 1, but wherein the face which the diverging bundle of X-rays strikes in the single crystal 14 is a face parallel to a prominent diffracting plane. This, in reality, is a special case of the form of the invention described in connection with Figure 1, or, in other words, one in which the angle $a$ is equal to 90°. It will be noted that in this particular arrangement the apparent image source A' is the same distance from the single crystal as is the real source A, and thus differs from the bias-cut single crystal system where the apparent image source A' is much closer to the single crystal than is the real source. Achromatization does, however, take place at the point N.

Reference has already been made to the use of an extended source at A, rather than a point source. In Figure 6 of the drawings, such an extended source is illustrated as being used in connection with a bias-cut single crystal 14 for analyzing the polycrystalline sample P. As shown in this figure, ACEN is the path of the central ray (of wave length λ). If the source is of the extent S, another "central" ray A'C'E'N' may be considered which is also of wave length λ, and hence parallel to the first. This second "central" ray will reach a point E' on the face of the polycrystalline sample P separated from E by a distance S' on the sample. After diffraction by the polycrystalline sample P, the second ray reaches a point N' separated by a distance S'' from N. By a proper choice of $a$, S'' can be made very small. We have determined that the distance S'' is given by the following equation:

$$S'' = S \cos 2\theta \frac{\cos (\theta_m + \alpha)}{\cos (\theta_m - \alpha)}$$

It will be observed from an inspection of the above equation that $\theta_m + \alpha$ may be so chosen that the extended source S can be reduced to a very small image S''. For example, if $\theta$ and $\theta_m$ are each 80° and $a$ is taken at 20°, and the extended source at A is 0.1 mm. (produced by electron focusing), then with these values, it is possible to reduce the source to an image of only 0.03 mm. in extent.

We have further found that in precision measurement of lattice parameters, it is necessary to use $\theta$ values as large as possible, preferably near 80° or more.

While we have shown a particular embodiment of our invention, it will, of course, be understood that we do not wish to be limited thereto, since many modifications may be made, and we, therefore, contemplate by the appended claims to cover all such modifications that fall within the true spirit and scope of our invention.

We claim as our invention:

1. The method of X-ray analysis which comprises producing a polychromatic beam of X-rays having a central ray of wave length λ, disposing a single crystal in the path of said beam to produce a diffracted divergent beam, disposing a polycrystalline sample in the path of said diffracted beam, thereby to produce a second diffracted beam, and locating an X-ray sensitive indicating medium in the path of said second diffracted beam and at a predetermined distance from said sample measured along the path of said central ray of wave length λ of said second diffracted beam, said predetermined distance being equal to $$\frac{V - l \frac{\cos (\theta_m + \alpha)}{\cos (\theta_m - \alpha)}}{\left(1 + 2 \frac{\tan \theta}{\tan \theta_m}\right)\left(-\frac{1}{\cos 2\theta}\right)}$$

where $l$ equals the distance from the source to the single crystal measured along the path of said central ray of wave length λ, $\theta_m$ is the Bragg angle for said central ray of wave length λ diffracted by the single crystal, $\theta$ is the Bragg angle for said central ray of wave length λ diffracted by said polycrystalline sample, V is the distance between the single crystal and the polycrystalline sample and $a$ is equal to the angle between the bias-cut face of said single crystal and the normal to a prominent diffracting plane.

2. The method of obtaining a sharply reduced image of a source of X-rays in which a bias-cut single crystal is disposed with its bias-cut face in the path of a polychromatic beam of X-rays emanating from a source having a finite width S, positioning a polycrystalline sample in the path of the diffracted beam of X-rays diffracted by said single crystal, and locating an X-ray sensitive indicating medium in the path of said second diffracted beam at a predetermined distance from said polycrystalline sample, said second diffracted beam being achromatized at an achromatic focal point whose distance from the polycrystalline sample is equal to:

$$\frac{V - l \frac{\cos (\theta_m + \alpha)}{\cos (\theta_m - \alpha)}}{\left(1 + 2 \frac{\tan \theta}{\tan \theta_m}\right)\left(-\frac{1}{\cos 2\theta}\right)}$$

where $l$ equals the distance from the source to the single crystal measured along the path of said central ray of wave length λ, $\theta_m$ is the Bragg angle for said central ray of wave length λ diffracted by the single crystal, $\theta$ is the Bragg angle for said central ray of wave length λ diffracted by said polycrystalline sample, V is the distance between the single crystal and the polycrystalline sample and $a$ is equal to the angle between the bias-cut face of said single crystal and the normal to a prominent diffracting plane, and where the size of the reduced image is equal to:

$$S \cos 2\theta \frac{\cos (\theta_m + \alpha)}{\cos (\theta_m - \alpha)}$$

where S is the finite width of the source of X-rays.

3. The method of X-ray analysis which comprises producing a polychromatic beam of X-rays having a central ray of wave length λ, disposing a single crystal in the path of said beam to produce a diffracted divergent beam, disposing a polycrystalline sample in the path of said diffracted beam, thereby to produce a second diffracted beam, positioning an X-ray sensitive indicating medium in front of said second diffracted beam along a predetermined path, noting the location of the achromatic focus of said second diffracted beam along said path, and then determining the angle (180°−2$\theta$), whereby the atomic spacing of the polycrystalline sample may be determined, said predetermined path being defined by the following equation:

$$F = \frac{V - l \frac{\cos (\theta_m + \alpha)}{\cos (\theta_m - \alpha)}}{\left(1 + 2 \frac{\tan \theta}{\tan \theta_m}\right)\left(-\frac{1}{\cos 2\theta}\right)}$$

where F is the distance from the polycrystalline sample to the acromatic focus along the path of said ray of wavelength λ of said second diffracted beam, $l$ equals the distance from the source to the single crystal measured along the path of said central ray of wavelength λ, $\theta_m$ is the Bragg angle for said central ray of wavelength $\lambda$ diffracted by the single crystal, $\theta$ is the Bragg angle for said central ray of wavelength $\lambda$ diffracted by said polycrystalline sample, V is the distance between the single crystal and the polycrystalline sample along the path of said central ray of wavelength $\lambda$ of said first diffracted beam, and $\alpha$ is equal to the angle between the bias-cut face of said single crystal and the normal to a prominent diffracting plane.

HANS EKSTEIN.
STANLEY SIEGEL.

REFERENCES CITED

The following references are of record in the file of this patent:

UNITED STATES PATENTS

| Number | Name | Date |
|---|---|---|
| 2,452,045 | Friedman | Oct. 26, 1948 |

OTHER REFERENCES

X-Rays and Electrons, by A. H. Compton, pp. 133 and 134, D. Van Nostrand Co., New York, 1926.